(12) United States Patent
Li (10) Patent No.: US 11,163,146 B2
(45) Date of Patent: Nov. 2, 2021

(54) SCANNING MICROSCOPE OBJECT STAGE

(71) Applicant: Xinyu Li, Beijing (CN)

(72) Inventor: Xinyu Li, Beijing (CN)

( * ) Notice: Subject to any disclaimer, the term of this patent is extended or adjusted under 35 U.S.C. 154(b) by 263 days.

(21) Appl. No.: 16/407,678

(22) Filed: May 9, 2019

(65) Prior Publication Data

US 2020/0209605 A1 Jul. 2, 2020

(30) Foreign Application Priority Data

Dec. 29, 2018 (CN) .......................... 201811639395.4

(51) Int. Cl.
*G02B 21/26* (2006.01)
*G02B 21/00* (2006.01)

(52) U.S. Cl.
CPC ......... *G02B 21/26* (2013.01); *G02B 21/0024* (2013.01)

(58) Field of Classification Search
CPC .... G02B 21/00; G02B 21/0024; G02B 21/24; G02B 21/26; G02B 21/34; G02B 7/00; G02B 7/003
USPC ................................ 359/391, 396, 398, 385
See application file for complete search history.

(56) References Cited

U.S. PATENT DOCUMENTS

| | | | |
|---|---|---|---|
| 4,204,045 A * | 5/1980 | Kjellander | C12M 23/04 220/555 |
| 4,248,498 A | 2/1981 | Georges | |
| 4,404,722 A | 9/1983 | Shimai | |
| 4,836,667 A | 6/1989 | Ozeki | |
| 5,367,401 A | 11/1994 | Saulietis | |
| 5,659,376 A | 8/1997 | Uehara et al. | |
| 6,118,582 A * | 9/2000 | Del Buono | G02B 21/26 359/391 |
| 7,180,689 B2 | 2/2007 | Shinada | |
| 9,488,822 B2 * | 11/2016 | Machida | G02B 21/34 |
| 2002/0024013 A1 | 2/2002 | Gerlach et al. | |
| 2004/0083799 A1 | 5/2004 | Markakis et al. | |
| 2005/0088731 A1 | 4/2005 | Shinada | |
| 2005/0271548 A1 | 12/2005 | Yang et al. | |

(Continued)

FOREIGN PATENT DOCUMENTS

| | | |
|---|---|---|
| CN | 1881002 A | 12/2006 |
| CN | 202974843 U | 6/2013 |

(Continued)

*Primary Examiner* — Thong Q Nguyen
(74) *Attorney, Agent, or Firm* — Werschulz Patent Law, LLC; Patricia P. Werschulz, Esq.

(57) ABSTRACT

A scanning microscope object stage comprising a retainer plate and a movable plate. The retainer plate has a primary light transmission channel, around which there are spacing bosses, and the movable plate has a secondary light transmission channel, which snaps right to the outer side of the spacing bosses. Along the top edge of the two opposing sides of the secondary light transmission channel is a slide stage for carrying the object slide. The height of the first height side wall is larger than or equals to the thickness of the movable plate. The second height side wall stands opposite to the slide stage and is of the same height. With the help of the spacing bossed on the retainer, the movable plate is easily positioned onto the retainer plate, and can be rapidly placed and replaced, and therefore, simultaneous placement and replacement for multiple object slides can be realized.

11 Claims, 7 Drawing Sheets

(56) References Cited

U.S. PATENT DOCUMENTS

| | | | | |
|---|---|---|---|---|
| 2011/0266181 A1* | 11/2011 | Morozov | ............... | G02B 21/34 206/456 |
| 2013/0201553 A1* | 8/2013 | James | .................... | G02B 21/34 359/398 |
| 2013/0222895 A1 | 8/2013 | Gelbart | | |
| 2013/0294826 A1 | 11/2013 | Chen | | |
| 2018/0373017 A1 | 12/2018 | Dixon | | |
| 2019/0033568 A1 | 1/2019 | Li | | |

FOREIGN PATENT DOCUMENTS

| | | |
|---|---|---|
| CN | 203084281 U | 7/2013 |
| CN | 204065545 U | 12/2014 |
| CN | 204556662 U | 8/2015 |
| CN | 105223682 A | 1/2016 |
| CN | 205027634 U | 2/2016 |
| CN | 107065160 A | 8/2017 |
| CN | 206818969 | 12/2017 |
| CN | 207850898 U | 9/2018 |
| CN | 109030371 A | 12/2018 |
| JP | 2003140053 A | 5/2003 |
| JP | 4720078 | 10/2003 |
| JP | 2005128429 A | 5/2005 |

\* cited by examiner

SCANNING MICROSCOPE OBJECT STAGE

CROSS-REFERENCE TO RELATED APPLICATIONS

This application is a nonprovisional utility patent application claiming priority to serial number 201811639395.4, filed in the People's Republic of China Patent Office on Dec. 29, 2018 under the Paris Convention and is expressly incorporated herein by reference in its entirety.

TECHNICAL FIELD

The present disclosure relates generally to a scanning microscope scanning technology. More particularly, the present disclosure relates to a scanning microscope object stage.

BACKGROUND

The existing scanning microscope comprises an image acquisitor, a scanning mechanism, an object stage and a light source. Specifically, the object stage is used to carry the object slide, on which the object to be scanned is placed.

Generally speaking, most of the existing object stages can take only one object slide (the pathological section). Driven by the rapid development of artificial intelligence (AI), big data and other technologies, digital image acquisition from the pathological section has become a necessity. To meet the need of massive pathological section scanning, electronic loading of the object slide onto the object stage is commonly accepted to realize the objective of continuous scanning. To solve the problem, we provide a fully automatic scanning microscope that can scan a plurality of sections via a multi-lens all at once.

To use this fully automatic scanning microscope, there is an urgent need for an object stage that can rapidly load slides in batches at one time and feed the next batch rapidly when scanning is over.

BRIEF SUMMARY

The technical problem to be solved by the present disclosure is to provide an object stage of a scanning microscope, which can rapidly load slides in batches at one time and feed the next batch rapidly while keeping the stability of the object stage.

To solve the problem mentioned above, this disclosure provides an object stage of a scanning microscope, comprising a retainer plate and a movable plate. The retainer plate is provided with primary light transmission channels around which there are provided spacing bosses. The movable plate is provided with secondary light transmission channels corresponding to the primary light transmission channels. The secondary light transmission channels are snapped right to the outer side of the spacing bosses, and the top edges of the two opposing sides of the secondary light transmission channels are provided with slide stages for carrying the object slide.

With such design, this disclosure has at least the following advantages:

1. In this disclosure, by using the spacing bosses on the retainer plate as well as the movable plate, the secondary light transmission channel on the movable plate can be snapped right to spacing bosses, therefore, the movable plate can be secured and positioned onto the retainer plate easily and conveniently, and rapid placement and replacement of object slides and placement and replacement of a plurality of object slides at one time can be realized.

2. Light transmission channels on both the retainer plate and movable plate are conducive to transmission of light below the object stage. Slide stages along top edges of the opposite sides of the secondary light transmission channel are conducive to the placement of the object slide.

3. The facts that the height of the first height side wall in the spacing bosses is larger than or equals to the thickness of the movable plate and that upper surface of the partition plate is parallel to that of the first height side wall are conducive to positioning of the object slides and performance of microscopic scanning.

4. Groove on the slide stage can facilitate rapid placement and removal of object slides.

BRIEF DESCRIPTION OF THE DRAWINGS

The above-mentioned contents are only an overview of the technical solution of the present disclosure. In order to understand more clearly the technical means of the disclosure, the present disclosure will be described in further details through the combination of the drawings and specific embodiments.

DETAILED DESCRIPTION OF THE PREFERRED EMBODIMENTS

As shown in FIG. 1-11, the scanning microscope object stage in this embodiment comprises a retainer plate 1 and a movable plate 2. The retainer plate 1 is secured onto the scanning microscope and the movable plate 2 is used to carry object slides. The movable plate 2 and object slides thereon can be placed onto the retainer plate 1 together via a snapping mechanism, easily and conveniently. Below is the specific structure of the embodiment.

In this embodiment, the retainer plate 1 is provided with a primary light transmission channel 11, through which a light source below the object stage can illuminate the object slide. Around the said primary light transmission channel there is provided a spacing boss 12.

In this embodiment, on the retainer plate 1 there are provided two primary light transmission channels 11 that are parallel to each other, around which there are provided the spacing bosses 12. Besides, the primary light transmission channel 11 is provided with two partition plates 13, which divide the said two primary light transmission channels 11 into three even areas.

Figure 1:
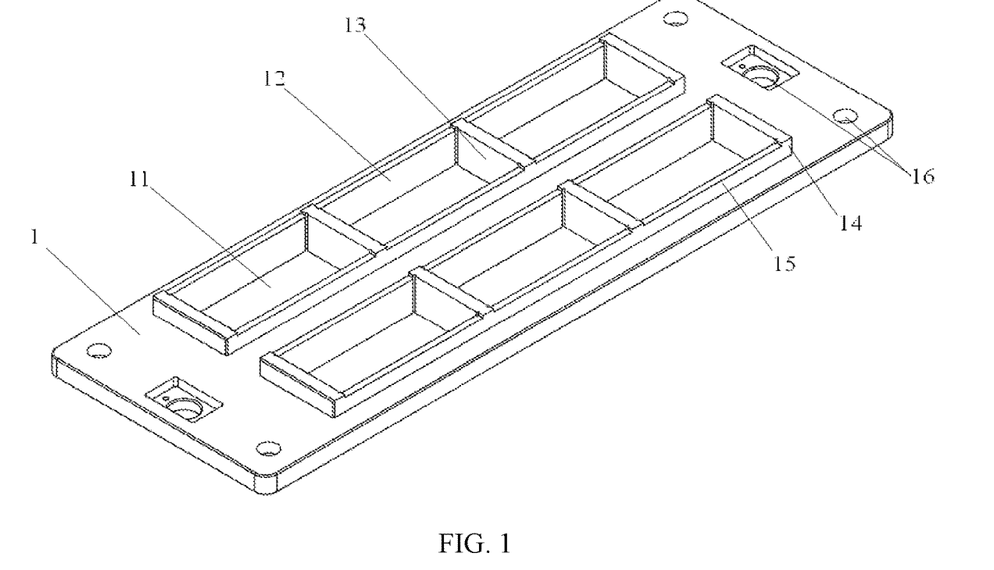
FIG. 1 is a perspective view of a retainer plate in a scanning microscope object stage according to the present disclosure.
Figure 2:
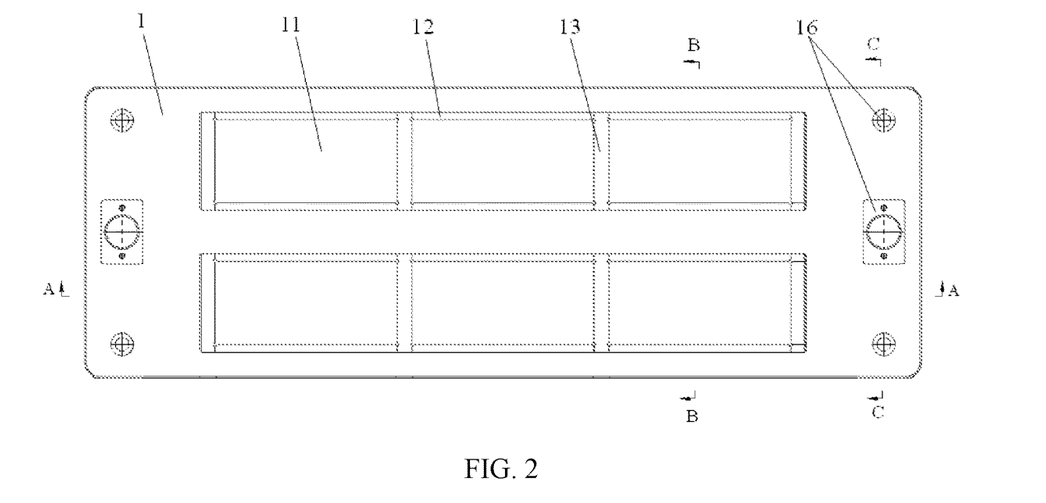
FIG. 2 is a front view of the retainer plate in the scanning microscope object stage according to the present disclosure.
Figure 3:
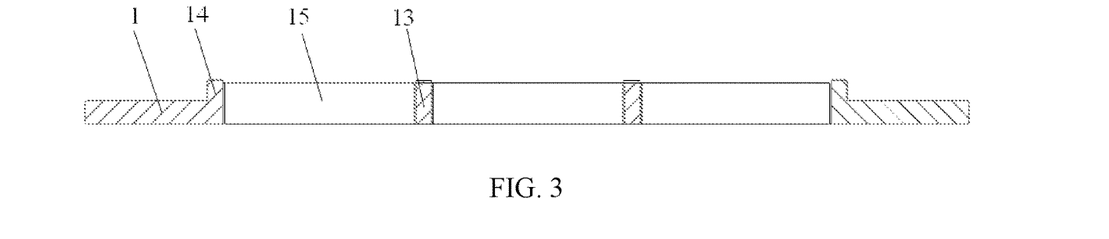
FIG. 3 is a cutaway view of A-A line in FIG. 2.
Figure 4:
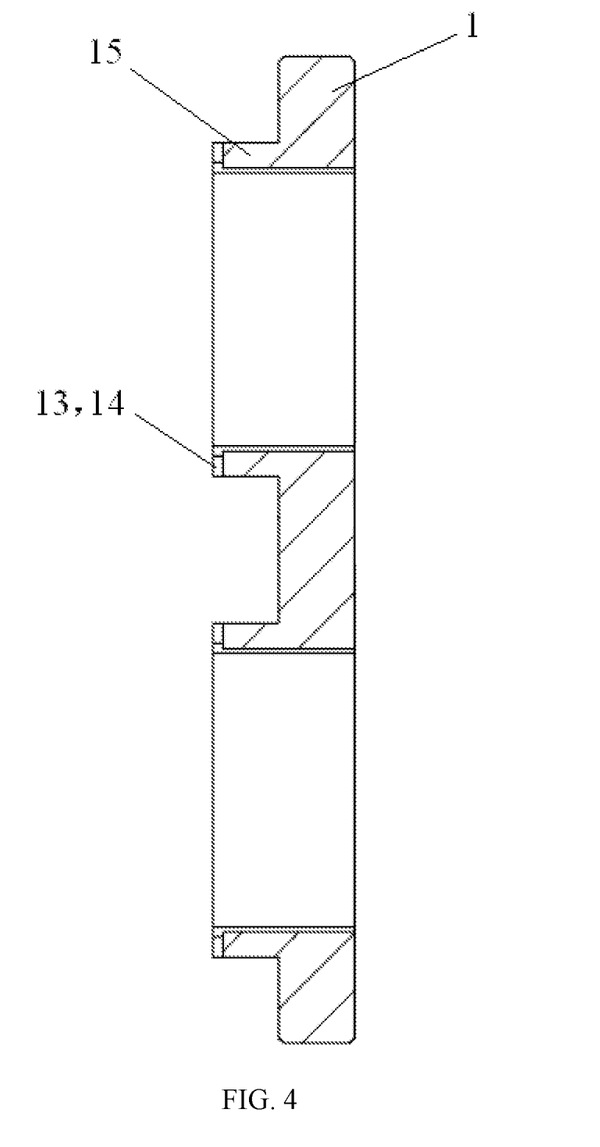
FIG. 4 is a cutaway view of B-B line in FIG. 2.
Figure 5:
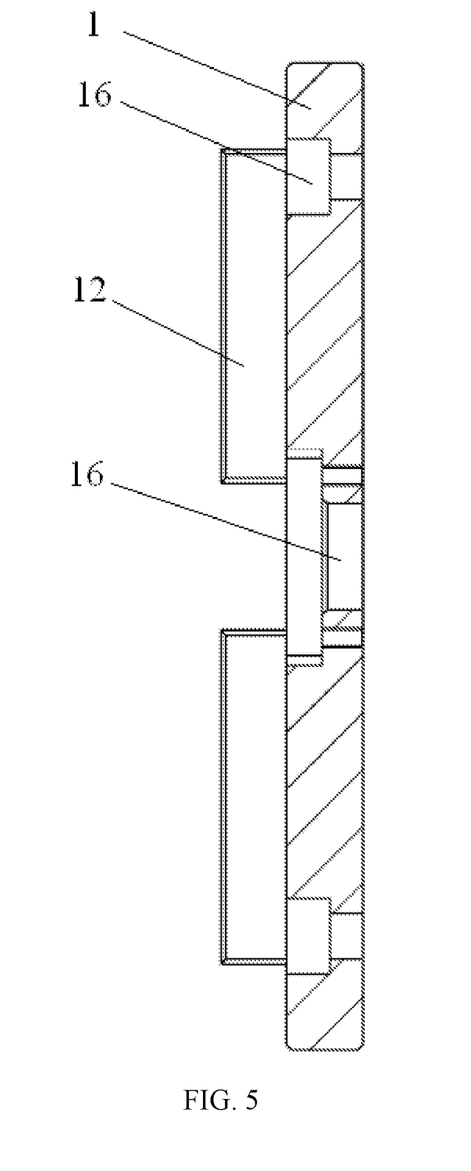
FIG. 5 is a cutaway view of C-C line in FIG. 2.
Figure 6:
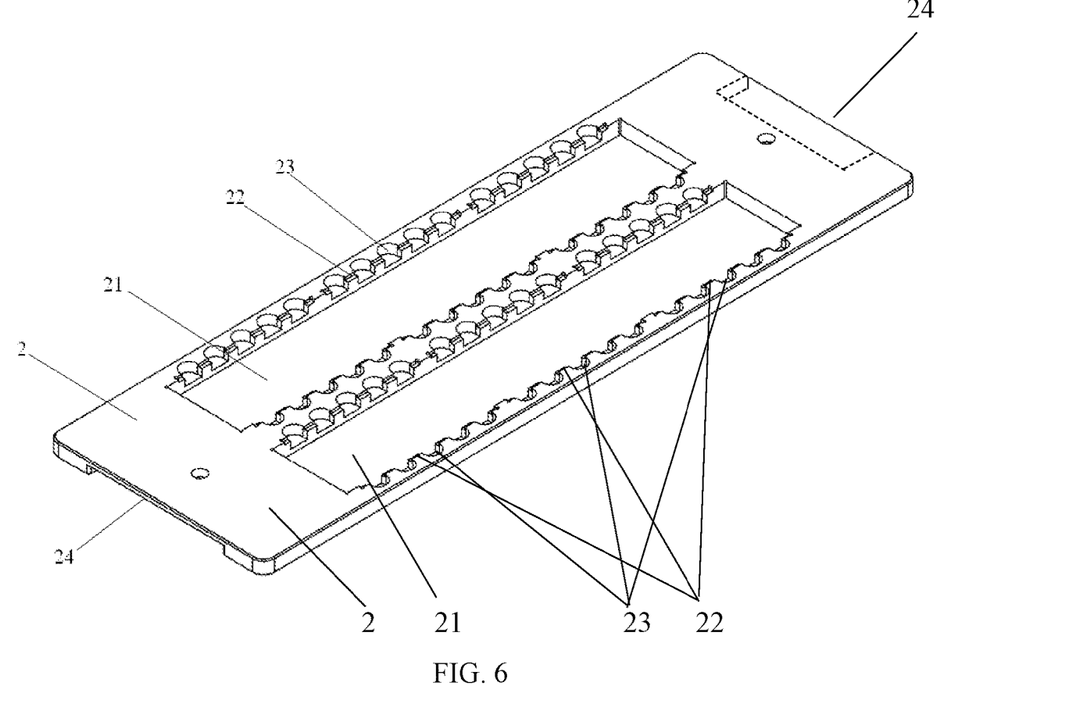
FIG. 6 is a perspective view of a movable plate in an object stage of a scanning microscope according to the present disclosure.
Figure 7:
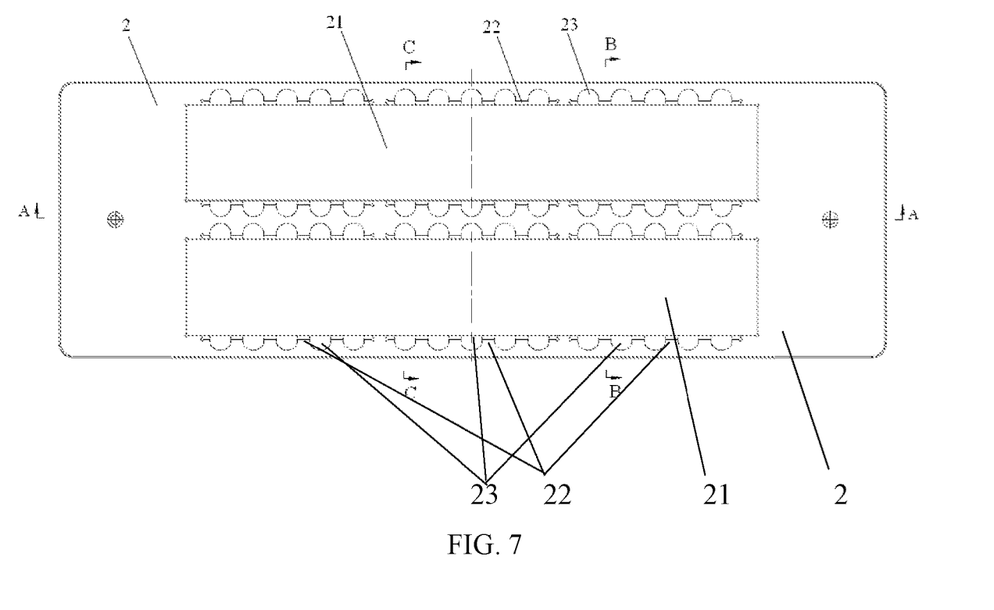
FIG. 7 is a front view of the movable plate in the scanning microscope object stage according to the present disclosure.
Figure 8:
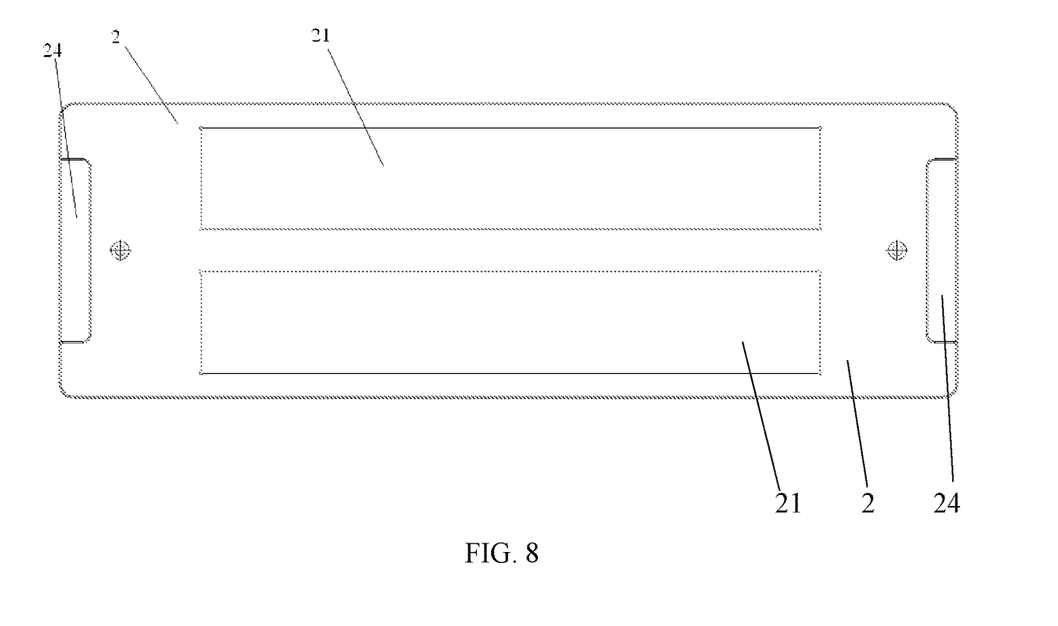
FIG. 8 is a back view of the movable plate in the scanning microscope object stage according to the present disclosure.
Figure 9:
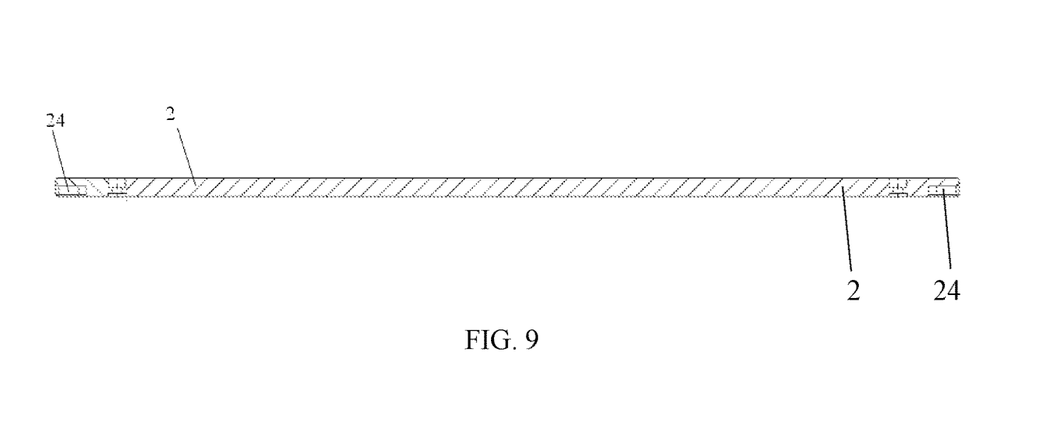
FIG. 9 is a cutaway view of A-A line in FIG. 7.
Figure 10:
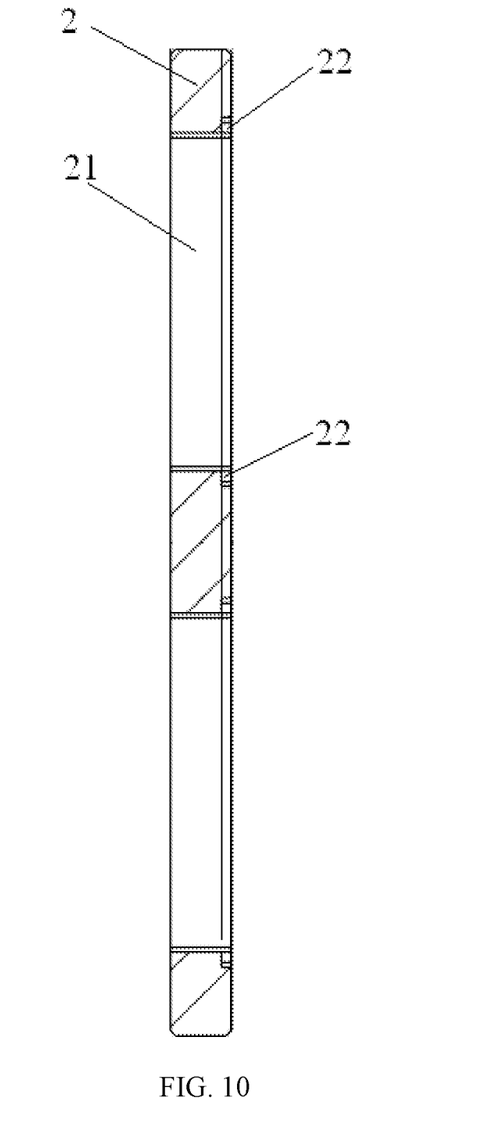
FIG. 10 is a cutaway view of B-B line in FIG. 7.
Figure 11:
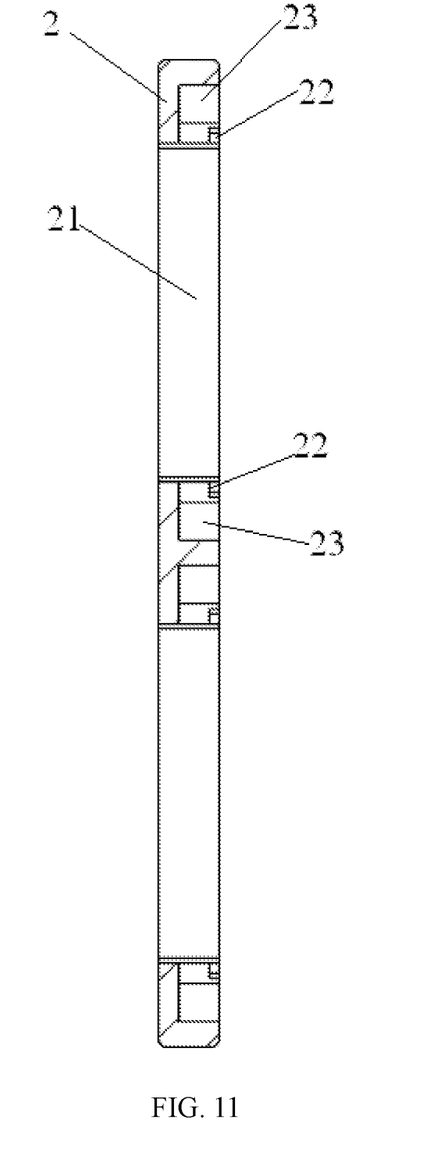
FIG. 11 is a cutaway view of C-C line in FIG. 7.

On the movable plate 2 there are provided a pair of secondary light transmission channels 21 corresponding to the two primary light transmission channels 11. The two secondary light transmission channels 21 are snapped right to the outer side of the two spacing bosses 12 respectively. Thus, the movable plate can be snapped and limited to the retainer plate easily and conveniently. The top edges of the two opposite sides of the secondary light transmission channels 21 there are provided the slide stage 22 for carrying the object slide.

The distance from the bottom of the slide stage 22 to the upper surface of the movable plate 2 equals to the thickness of the object slide. Thus, when the object slide is placed onto the slide stage 22, the upper surface of the object slide is parallel to that of the movable plate 2.

Besides, the spacing boss 12 is provided with a first height side wall 14 and a second height side wall 15. The height of the first height side wall 14 equals to the thickness of movable plate 2. The said second height side wall 15 stands opposite to the slide stage 22. The height of the said second height side wall 15 equals to that of the slide stage 22. The upper surface of the partition plate 13 is parallel to that of the first height side wall 14 so that the partition plate is higher than the upper surface of the movable plate, facilitating positioning of the object slides in each areas separated by the partition plates and scanning by the scanning microscope.

To facilitate the placement and removal of the object slide, the slide stage 22 is provided with a plurality of grooves 23 for removing and loading the object slide. Operators can easily put their fingers into a groove 23 to rapidly remove and load the object slide.

On the secondary light transmission channel 21 there are provided multiple slide stages 22 that are in a parallel arrangement to each other. Each slide stage 22 corresponds to one groove 23. In this embodiment, on the secondary light transmission channels 21 there are provided fifteen (15) pairs of slide stages, which are divided into three (3) groups by the partition plates 13, with five (5) pairs of slide stages in each group.

In addition, on the retainer plate 1 there is provided a plurality of retainer holes 16, which is used to secure the retainer plate 1 onto the scanning microscope. The length of the movable plate 2 equals to or is larger than that of the retainer plate 1. Besides, on lower surface of both ends of the movable plate 2 there is provided a gap 24, which can facilitate removal and loading of the movable plate and help avoid error operation during removal and loading of the movable plate.

In using the scanning microscope with the object stage, first of all 30 object slides are placed onto a movable plate, and the movable plate and the 30 object slides are snapped together into the retainer plate, then scanning can be started. At the same time, another 30 object slides may be placed on a spare movable plate. After all object slides on the first movable plate are scanned, the first movable plate is taken down rapidly and the spare movable plate is loaded rapidly. Thus, the invention can realize rapid placement and accurate positioning of object slide, thus improving scanning efficiency of scanning microscope.

The primary light transmission channel of the retainer plate and the movable plate in the invention may be lengthened or shortened but not widened based upon the actual situation, such as the amount of object slides being loaded. In addition, the amount of partition plates inside may be increased/decreased flexibly.

In this invention, the spacing bosses on the retainer plate as well as the movable plate together make the secondary light transmission channel on the movable plate snapped right to the spacing boss, thus realizing the stable positioning of the movable plate on the retainer plate. As thus, the object slides may be secured and placed rapidly and also more than one object slides may be placed and replaced at one go.

Finally, it should be noted that the above embodiments are only for explaining, but not limiting, the technical solutions of the utility model. Those of ordinary skill in the art should understood that the technical solutions described in the foregoing embodiments may be modified, or some or all of the technical features may be equivalently substituted; and such modifications or substitutions do not make the essence of the corresponding technical solutions depart from the scope of the technical solutions of the utility model.

What is claimed is:

1. A scanning microscope object stage, comprising:
    a retainer plate with at least one primary light transmission channel, the at least one primary light transmission channel having a plurality of spacing bosses around the primary light transmission channel, the spacing bosses having an outer side; and
    a movable plate having at least one secondary light transmission channel, the at least one secondary light transmission channel having a pair of opposing sides, each opposing side having a top edge, the top edge of the opposing side carrying a slide stage of an object slide, the at least one secondary light transmission channel corresponding to the at least one primary light transmission channel of the retainer plate when the movable plate snaps to the outer side of the spacing bosses of the retainer plate.

2. The scanning microscope object stage of claim 1, wherein the slide stage has a bottom and the movable plate has an upper surface and wherein a distance from the bottom of the slide stage to the upper surface of the movable plate equals a thickness of the object slide.

3. The scanning microscope object stage of claim 2, wherein the movable plate has a thickness and the plurality of spacing bosses has a first height side wall and a second height side wall opposite to the slide stage, the slide stage having a height, the height of the said first height side wall is greater than or equal to the thickness of the movable plate and the said second height side wall is the same height to the height of the slide stage.

4. The scanning microscope object stage of claim 3, wherein a partition plate having an upper surface is disposed inside the at least one primary light transmission channel, the upper surface of the partition plate being parallel to the first height side wall.

5. The scanning microscope object stage of claim 4, wherein the slide stage further comprises a plurality of grooves for removing and loading the object slide.

6. The scanning microscope object stage according to claim 5, wherein a plurality of slide stages is disposed in a parallel arrangement on the secondary light transmission channel, and each slide stage corresponding one to one to a pair of opposing grooves on the movable plate.

7. The scanning microscope object stage of claim 6, wherein the retainer plate further comprises:
    the at least one primary light transmission, channel having a first primary light transmission channel, the first primary light transmission having an inside and a second primary light transmission channel, the second primary light transmission channel having an inside, the second primary light transmission channel parallel to the first primary light transmission channel on the retainer plate, the spacing bosses disposed around the first primary light transmission channel and the second primary light transmission channel; and the movable plate further comprises the at least one secondary light transmission channel corresponding to the at least one primary light transmission channel on the retainer plate; the at least one secondary light transmission channel snapping to the outer sides of the spacing bosses on the retainer plate respectively.

8. The scanning microscope object stage of claim 7, wherein two partition plates are disposed within the inside of the first primary light transmission channel and two partition plates are disposed within the inside of the second primary light transmission channel.

9. The scanning microscope object stage of claim 7, wherein the retainer plate has a plurality of retainer holes.

10. The scanning microscope object stage of claim 7, wherein the movable plate and the retainer plate each has a length and the length of the movable plate is larger than or equals to that of the said retainer plate.

11. The scanning microscope object stage of claim 1, wherein a plurality of gaps is provided on a lower surface of the movable plate.

* * * * *